Nov. 3, 1931.  W. C. McCOY  1,830,519
METHOD OF FORMING PISTONS
Filed May 12, 1930   2 Sheets-Sheet 1

INVENTOR
William C. McCoy
BY
Evans & McCoy
ATTORNEYS

Nov. 3, 1931.  W. C. McCOY  1,830,519
METHOD OF FORMING PISTONS
Filed May 12, 1930  2 Sheets-Sheet 2

INVENTOR
William C. McCoy
BY
Evans & McCoy
ATTORNEYS.

Patented Nov. 3, 1931

1,830,519

UNITED STATES PATENT OFFICE

WILLIAM C. McCOY, OF SHAKER HEIGHTS, OHIO, ASSIGNOR TO THE CLEVELAND TRUST COMPANY, OF CLEVELAND, OHIO, A CORPORATION OF OHIO

METHOD OF FORMING PISTONS

Application filed May 12, 1930. Serial No. 451,655.

This invention relates to improvements in the method of making pistons for internal combustion engines, and is a continuation in part of my copending application Serial No. 331,513, filed January 10th, 1929, now Patent No. 1,761,142, dated June 3, 1930.

One of the objects of the present invention is to provide a method of manufacturing pistons of two metals having different coefficients of expansion, wherein provision is made for permitting expansion of one metal without affecting the operation of the piston.

Another object is to provide a method of manufacturing a piston of two different kinds of metal, the body portion being of aluminum, or an alloy thereof, and a bearing ring being of the same material as the cylinder in which the piston operates, wherein the aluminum body may expand independently of the bearing ring without affecting the operation thereof.

Another object is to provide a method of manufacturing pistons, whereby the body portions may be formed of an aluminum alloy or other light-weight metal, protected at points subjected to greatest wear with a metal having a coefficient of expansion nearly the same as the cylinder within which the piston is adapted to operate.

Another object is to provide a method of making an aluminum alloy piston having a bearing ring in the head thereof of different material than the material of the piston body, wherein the piston body may expand and contract independently of the bearing ring.

Another object is to provide a method of constructing light-weight pistons of aluminum alloy whereby provision is made for permitting expansion and contraction thereof without affecting the efficient operation thereof and without producing piston slap and other objectionable operating features.

A further object is to provide a method of constructing pistons wherein a piston body of aluminum, aluminum alloy or other light-weight metal may be cast within a continuous wear ring of a metal having a lower coefficient of heat expansion, and wherein the bearing ring may be secured to the explosion thrust face of the piston body.

Another object of this invention is to provide a method of making a piston of aluminum alloy having a supplemental bearing ring of different material than aluminum alloy, the bearing ring being rigidly secured to the piston body substantially flush with the explosion thrust face of the piston.

A further object is to provide a method of forming a composite aluminum alloy piston which comprises casting the piston body around an endless bearing ring forming a groove adjacent a transverse face of the ring, yieldingly forcing the ring to one side of the retaining groove and securing one side of the ring to the piston body.

These being among the objects of the present invention, the same consists in certain methods of manufacture hereinafter described with reference to the accompanying drawings and then claimed, having the above and other objects in view.

In the drawings, which illustrate suitable embodiments of this invention,

Figure 1:
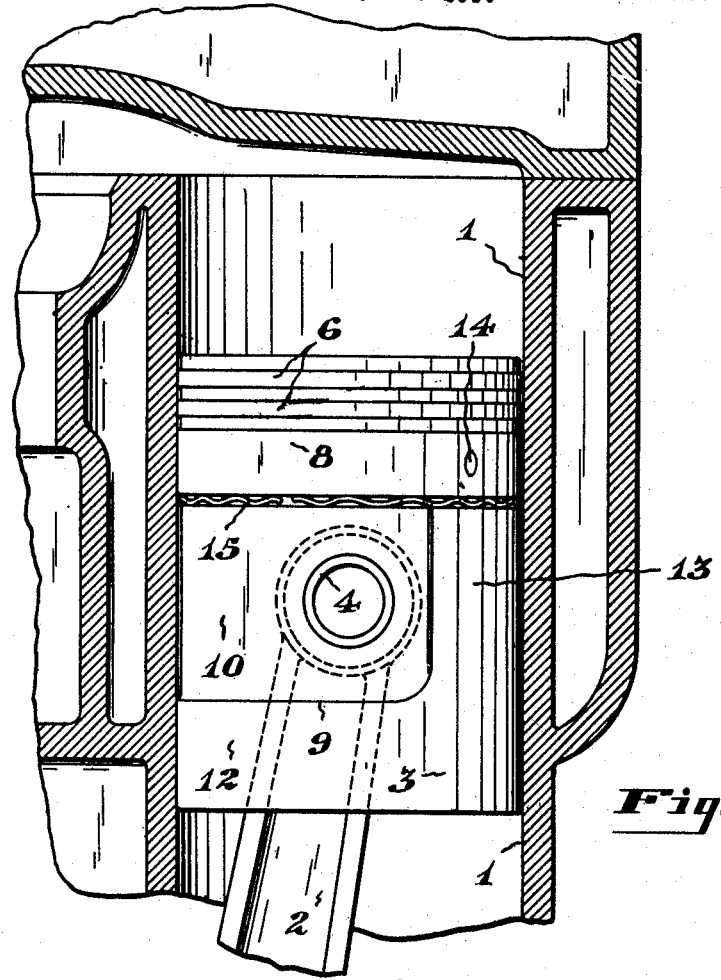
Figure 1 is a sectional view taken longitudinally through an engine cylinder showing a piston of the present invention mounted therein.

It has been proposed heretofore to construct pistons for internal combustion engines of aluminum alloy wherein the expansion of the piston body was controlled by members having a different rate of thermal expansion than aluminum alloy, but such members have been cast integrally with or permanently secured to the body of the piston. In many of these structures the piston body was substantially incompressible circumferentially; in others the piston skirt was split longitudinally.

A piston has also been proposed in which the piston body is thermally expansible and contractible independently of split bearing rings and having supplemental spring rings between the bearing rings and the piston body. The present invention contemplates a simplified form of piston having the operating advantages of these general types of pistons and being of less expensive construction.

The present invention proposes a method of making a piston body of aluminum alloy having relatively narrow circumferential bearing surface adjacent to its open end, a bearing surface extending substantially throughout its lateral explosion thrust face, and a bearing ring of relatively negligible thermally expansible material in the piston head which is rigidly secured to the piston body at the explosion thrust face. The bearing ring fits closely with the cylinder walls to permit independent contraction and expansion of the piston body, to thereby substantially prevent undesirable cylinder wall friction and scuffing of the piston body against the cylinder wall. The cylinder wall is also worn smooth by the material of the bearing ring in applicant's construction, which is preferably sufficiently hard to polish the cylinder wall and prevent rapid wear of the piston body, now commonly caused by irregularities or roughness in the cylinder wall, without sacrificing the bearing qualities of the aluminum alloy piston, thus insuring a close fitting piston of greatly prolonged life. The bearing ring, together with the circumferential bearing surface adjacent to the open end of the piston and the lateral bearing surface on the explosion thrust face of the piston, prevents piston slap and also prevents seizing of the piston body with the cylinder walls during the expansion of the aluminum alloy when the engine is run for a considerable length of time.

Referring to the accompanying drawings, in which like numerals refer to like parts throughout the several views, the piston shown is slidably positioned in a water jacketed engine cylinder 1 and is connected to an engine crank shaft (not shown) by a conventional connecting rod 2, the rod 2 being pivoted to the piston body 3 by a wrist pin 4 carried by the piston bosses 5. The piston comprises the piston body 3 of suitable aluminum alloy, a plurality of conventional packing rings 6 mounted in grooves 7 in the piston head, and an endless bearing ring 8 that is mounted in a suitable circumferential groove 11 formed adjacent to the packing ring grooves 7 above the wrist pin bosses 5.

The piston body is relieved over the upper portion of one lateral face and well beyond each of the wrist pin bosses 5, the contour of the relief thus described being defined by the line 9 that extends around the edge of the relief. The relief of the area 10 defined by the line 9 is either cast or machined into the piston body a sufficient degree to permit the relieved portion of the piston body to thermally expand within the cylinder without exerting excessive pressure against the cylinder wall under the most severe operating conditions.

Figure 6:
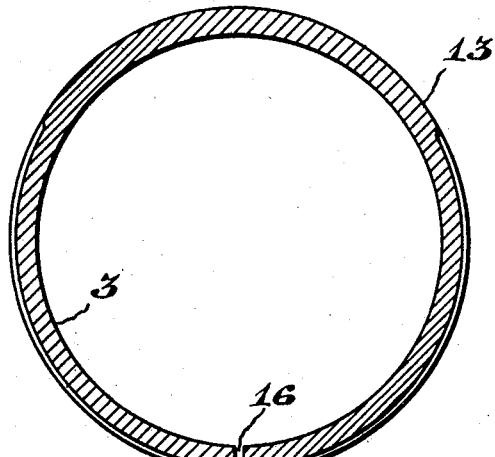
Fig. 6 is a transverse section taken substantially on line 6—6 of Fig. 2, showing the explosion thrust face of the piston body.

By relieving the piston body 3 as just described, a circumferential bearing surface 12 is provided adjacent to the open end of the skirt portion, which surface 12 is substantially of the same curvature as, and continuous with, the unrelieved portion 13 of the piston body on the explosion thrust face thereof. Sufficient outward spring pressure of the bearing surface 12 is obtained by slitting the skirt longitudinally from the open end thereof to a point well within the relieved area. The slit 16 is preferably formed opposite the explosion thrust face, as indicated in Fig. 6.

Figures 2, 3:
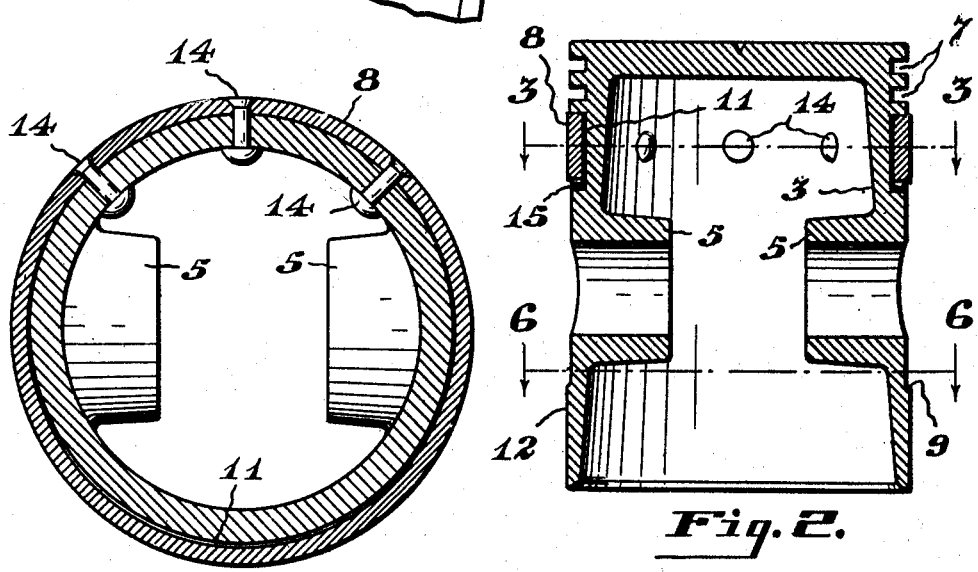
Fig. 2 is an axial section taken through the axis of the wrist pin of the piston shown in Fig. 1.
Fig. 3 is a transverse section taken substantially on line 3—3 of Fig. 2 showing the mounting for the bearing ring.
Figure 4:
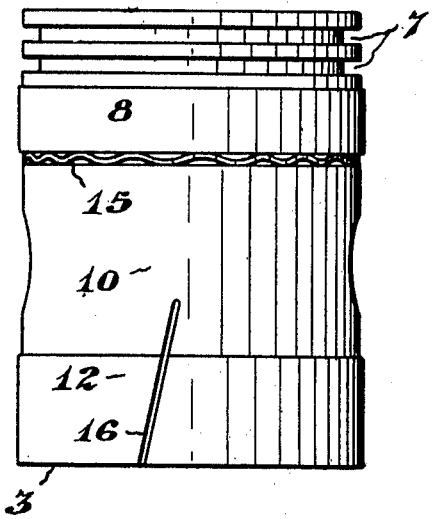
Fig. 4 is an elevational view showing the split skirt and lower bearing surface of the piston skirt.
Figure 5:
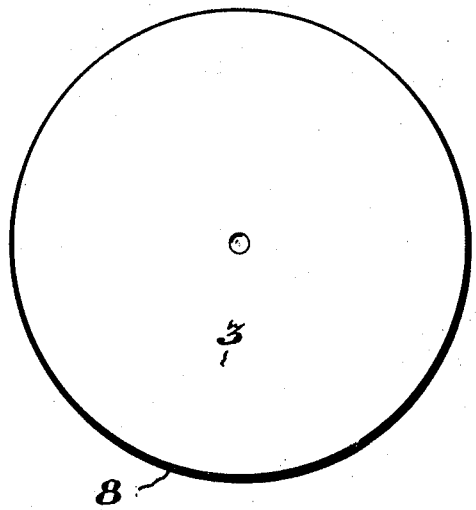
Fig. 5 is a plan view of the top of the piston showing the relative positions of the bearing ring and piston body.
Figure 7:
Fig. 7 is an elevational view of the spring ring.

The ring 8 is secured to the explosion thrust side of the piston body substantially flush with the lateral bearing face 13 by means of rivets 14. The rivets 14 are countersunk in the bearing ring 8 and extend through the piston wall, as shown in Fig. 3. A groove 11 is machined in the piston body adjacent one edge of the bearing ring 8 and a piston ring or wave ring 15 is positioned in the groove thus provided. The wave ring 15 is preferably formed of relatively stiff spring steel, such as the so-called Swedish steel, or other suitable material, and extends substantially around the entire circumference of the piston in this embodiment of the invention. The two ends of the wave ring 15, however, do not abut because of the necessity of accommodating the thermal contraction of the piston body. The wave ring 15 possesses sufficient spring characteristics to bear against the ring 8 and hold the same against the upper face of the groove 11 during the compression stroke of the piston to prevent the same from moving in a slight arc about the rivets 14, in order to eliminate scoring or cutting of the cylinder walls by the sharp upper edge of the bearing ring 8.

The bearing ring 8 may in some instances be formed of cast iron having the same characteristics as the cylinder walls, or it may be formed of steel alloy having a relatively low or negligible coefficient of thermal expansion.

The ring 8 normally has sufficient mechanical clearance in the engine cylinder 1 to accommodate the oil film between the cylinder wall and the piston. By making the bearing ring 8 of a material having a somewhat lesser coefficient of thermal expansion than the cylinder wall a bearing ring is obtained that will substantially maintain a constant clearance within the cylinder 1. A ring material of lesser coefficient of thermal expansion than the cylinder material is desired because of the high temperature at which the ring normally operates, as compared with the cylinder wall.

The piston is preferably formed in a permanent mold and the aluminum alloy comprising the body of the same is cast around the endless bearing ring 8, which is securely held within the mold cavity concentric with the inner walls of the piston to be cast. The aluminum alloy, when it cools after being cast, shrinks radially in all directions and therefore draws away from the inner circumference of the bearing ring 8, thereby forming the bottom of the ring groove 11, which is spaced equally from all points of the inner wall of the ring 8 that is held in the permanent mold. The piston body also, while shrinking radially, leaves the ring 8 projecting beyond the outer face of the piston body but remaining coaxial therewith. The piston body also shrinks longitudinally, firmly clamping the ring in this position. The relieved area 10 may, and preferably is, provided during the casting of the piston body. As soon as the piston is sufficiently cooled the bearing ring 8 is machined to the approximate size and the piston body is likewise machined to the approximate size. Other machining operations, such as reaming the wrist-pin bosses 5 and machining the packing ring grooves 7, may also be performed at this time. The split 16 may then be sawed or formed in any suitable manner in the skirt of the piston.

During the machining operations a suitable cutting tool is used to cut a circumferential recess adjacent to the lower edge of the bearing ring 8. In other words, the ring groove 11 is widened by cutting away the metal of the piston body adjacent to the lower edge of the bearing ring 8 to a suitable depth for the insertion of the wave ring 15. This frees the ring 8 from its clamped position in the piston body, to provide a groove that is wider than the bearing ring 8. The split wave ring 15 previously described is then positioned in place by inserting the same between the lower end face of the ring 8 and the lower side wall of the groove 11. The resiliency of the wave ring 15 forces the bearing ring 8 firmly against the upper side wall of the groove 11. The bearing ring 8 is then shifted transversely of the piston body, so that its inner face seats against the bottom of the groove 11 on the explosion thrust side of the piston body and the ring is secured to the piston body in this position by the rivets 14.

As shown in Fig. 3, the bearing ring 8 is eccentrically positioned relative to the bottom of the groove 11. When the bearing ring and outer surfaces of the piston are machined to approximate size it is preferable that the distance between their lateral faces on the thrust side of the piston be substantially equal to the clearance space, caused by shrinkage of the piston body during casting, between the bottom of the ring groove 11 and the inner wall of the ring 8, so that when the ring 8 is shifted to its eccentric position as just described, the outer face on the explosion thrust side of the same will be substantially flush with the lateral bearing surface 13 of the piston body. The bearing ring and the piston body are then ground to the correct size, and in this connection it is to be noted that the lateral bearing surface 13 has substantially the same radius as the ring 8, and also that the lower bearing surface 12 has substantially the same radius as the ring 8 and is substantially coaxial therewith when the piston is in place in the engine cylinder.

Figure 8:
Fig. 8 is an elevational view of a modified form of spring ring.

In Fig. 8 an alternative form of spring ring is shown, which comprises a split ring 20 having a plurality of overlapping slots 21 which render the same sufficiently resilient to hold the bearing ring 8 on its correct axial position and to still permit longitudinal contraction and expansion of the piston body without affecting the position of the bearing ring.

Figure 9:
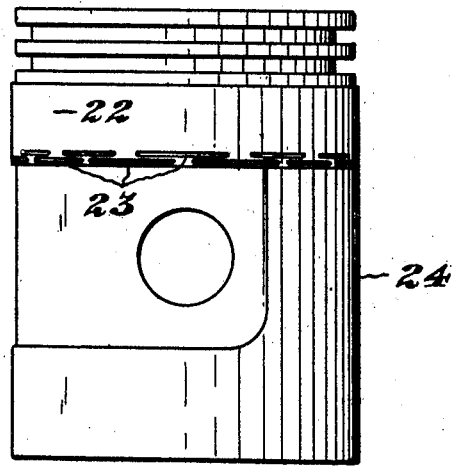
Fig. 9 is an elevational view showing a modification of a spring ring integral with the bearing ring.

Referring to the modified construction shown in Fig. 9, the bearing ring 22 is formed with a plurality of overlapping circumferential slots 23 which accomplish the same purpose as the wave ring 15 or ring 20. In this construction the spring ring is eliminated, and the machining operation of widening the bearing ring groove is not necessary. In casting the piston body 24 about the bearing ring 22, a suitable charable material may be employed to prevent the hot metal from flowing into the slots 23. This material preferably should be of such nature that it will not char until the cast metal has taken a permanent set.

In operation, a piston of the character described will bear on the bearing surface 13, and also preferably on the bearing ring 8 during the explosion or working stroke of the same. The other side of the piston, which is forced in the direction of the cylinder walls solely by the component of side thrust from the compression in the explosive chamber, bears on the bearing ring 8 and the unrelieved bearing surface 12 of the lower end of the piston skirt. It will, therefore, be seen that a very small clearance may be maintained in the zone of the packing rings of the piston, which prevents objectionable movement of the packing rings in the piston head, since the unrelieved bottom of the piston closely fits the cylinder wall and the top of the piston and also has a bearing ring in the head thereof, which closely fits the cylinder wall. The bearing ring 8 is so close a fit to the cylinder that it will serve in part as a packing ring, although it is endless and its size is not controlled by pressure engagement with the cylinder wall. Hence it is obvious that a minimum number of packing rings may be used. It is also evident that the piston body may expand independently of the bearing ring from its explosion thrust face without seizing with the cylinder wall because of the relieved area 10, which is free to expand as it will, and because of the split 16 in the lower portion of the piston skirt.

It can be seen that a piston is thus provided which has spaced bearing contacts with the cylinder wall on the one side of the piston body and full engagement with the cylinder wall on the explosion thrust side of the piston body to absorb the brunt of the explosion shock. It is evident that piston slap and wear of the cylinder wall will be reduced to a minimum.

Furthermore, it is to be understood that the particular procedure set forth, and the particular forms of apparatus shown and described, are presented for purposes of explanation and illustration, and that slight changes may be made without departing from the spirit and substance of the invention, the scope of which is commensurate with the appended claims.

What I claim is:

1. The method of forming a composite aluminum alloy piston which comprises casting a piston body about an endless bearing ring, forming a groove adjacent to one transverse face of said ring to substantially widen the ring retaining groove, yieldingly holding said ring to one side of the widened groove and rigidly securing one side of said ring to the piston body, whereby said ring is eccentrically mounted in said groove.

2. The method of forming a composite aluminum alloy piston which comprises supporting an endless bearing ring in a mold cavity, casting the body of said piston in said cavity around said bearing ring, cutting away the metal of said body adjacent a transverse face of said ring to substantially widen the ring retaining groove, yieldingly forcing said ring against one side of the widened groove and rigidly securing one side of said ring to the piston body, whereby said ring is eccentrically positioned in said groove.

3. The method of forming a composite piston having a body of aluminum alloy which comprises casting the piston body within a wear ring having a lesser coefficient of heat expansion than the piston body and in engagement therewith, permitting the cooling cast metal to radially withdraw from said wear ring to provide a circumferential space therebetween, moving said wear ring to an eccentric position in contact with a side portion only of the piston body and securing said wear ring to said piston body.

4. The method of forming a composite piston which consists in placing a wear ring in a mold cavity, pouring a molten aluminum alloy having a greater coefficient of heat expansion than the wear ring into the mold cavity which forms a piston body surrounding and in contact with the lateral sides and circumferential face of the wear ring, the metal of the piston body radially withdrawing from the wear ring during cooling to provide a circumferential space to permit expansion of the piston body independently of said wear ring, and then securing said ring in an eccentric position to one side of said piston body.

5. The method of forming a composite piston which consists in placing a wear ring in a mold cavity, pouring a molten aluminum alloy having a greater coefficient of heat expansion than said wear ring into the mold cavity in contact with the lateral sides and inner circumferential face of said wear ring to provide a piston body, the metal of the piston body radially withdrawing from the wear ring during cooling to provide a circumferential space therebetween for expansion of the piston body independently of and relative to said wear ring, rigidly securing said wear ring in an eccentric position to the explosion thrust side of said piston body, and turning down said piston body whereby said wear ring and piston body will be substantially flush at the explosion thrust side of said piston.

6. The method of forming a composite piston which consists in placing a wear ring in a mold cavity, pouring a molten aluminum alloy having a greater coefficient of heat expansion than said wear ring into the mold cavity in contact with the lateral sides and inner circumferential face of said wear ring to provide a piston body, the metal of the piston body radially withdrawing from the wear ring during cooling to provide a circumferential space therebetween for expansion of the piston body independently of and relative to said wear ring, circumferentially removing metal from said piston body adjacent a lateral face of said wear ring, and resiliently forcing said wear ring axially against said piston body.

7. The method of forming a composite piston which consists in placing a wear ring in a mold cavity, pouring a molten aluminum alloy having a greater coefficient of heat expansion than said wear ring into the mold cavity in contact with the lateral sides and inner circumferential face of said wear ring to provide a piston body, the metal of the piston body radially withdrawing from the wear ring during cooling to provide a circumferential space therebetween for expansion of the piston body independently of and relative to said wear ring, circumferentially removing metal from said piston body adjacent a lateral face of said wear ring, resiliently forcing said wear ring axially against said piston body, rigidly securing said wear ring in an eccentric position to the explosion thrust side of said piston body, and turning down said piston body whereby said wear ring and piston body will be substantially flush at the explosion thrust side of said piston.

In testimony whereof I affix my signature.

WILLIAM C. McCOY.